April 7, 1959 A. T. PEMBERTON 2,880,546
FISHING LINE GUIDE
Filed Aug. 16, 1956
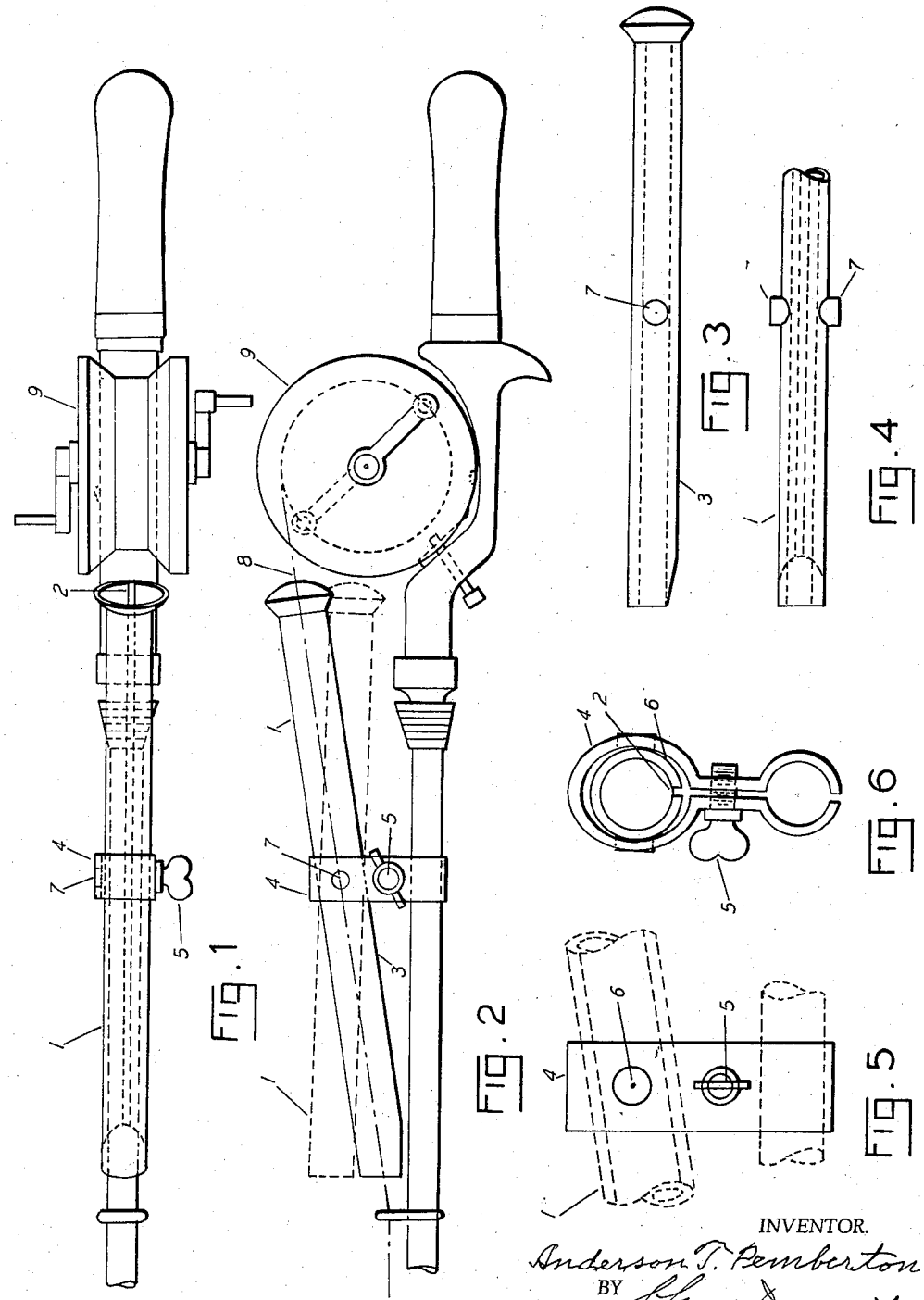
INVENTOR.
Anderson T. Pemberton
BY Chas. Denegre
Attorney.

2,880,546
FISHING LINE GUIDE

Anderson T. Pemberton, Cardiff, Ala.

Application August 16, 1956, Serial No. 604,387

2 Claims. (Cl. 43—24)

This invention relates to a fishing line guide. It has for its main objects to provide such a guide that will be highly satisfactory for the purpose intended, simple in structure, cheap to manufacture, easy to install for use and keep in working condition, and extremely durable. It is intended for use as an attachment on a fishing pole having a reel. Very often when a fish is hooked and pulls a line from a reel violently, the hand or fingers of the fisherman become cut by the fast movement of the line. The present invention will overcome any chance of being cut by a fishing line in use.

Other objects and advantages will appear from the drawing and description.

By referring generally to the drawing it will be observed that Fig. 1 is a plan view of the handle portion of a fishing pole with a reel mounted thereon and the present guide for a fishing line removably attached to the pole; Fig. 2 is a side elevational view of Fig. 1 with a fishing line portion in the guide; Fig. 3 is a side view of the tube portion of the guide; Fig. 4 is a plan view of the tube, partly broken away; Fig. 5 is an enlarged detail view showing the clamp portion of the guide in full lines and part of the tube and pole in broken lines; and Fig. 6 is an end view of the attaching clamp assembly.

Similar reference numerals refer to similar parts throughout the several views.

Referring to the drawing in detail it will be seen that the guide comprises a tube 1 with a slit 2 along in its bottom portion 3. A clamp 4 having a wing screw 5 is of a size for its upper portion to fit around most of the circumference of the tube. Holes 6 are provided in the clamp for the integral extensions 7 on the tube to be inserted therein. A fishing line 8 leading from the reel 9 is shown inserted through the tube. The line may be inserted through the tube by passing its free end therethrough. If the line and reel are on the pole, the guide may be attached by placing the tube and clamp, less its screw, over the line, thus entering the line through the bottom of the clamp and the slit in the tube, then inserting and tightening the wing screw for holding the assembled guide in position for use as plainly shown in Figs. 1 and 2. The slit 2 in tube 1 is adjustable as to the width thereof and may be closed if desired to avoid any chance of the line falling therethrough, by tightening the wing nut 5 to thus compress the clamp 4 and close the slit.

From the foregoing it will appear that the guide is adapted for easy removable attachment to any fishing pole having a reel and line thereon.

The guide may be made of any material suitable for the purpose, but I prefer to use plastic for the tube and rust proof metal for the clamp assembly. Also the guide may be made in different sizes and capacities, depending on the sizes of poles, reels, and lines on which it is to be used.

While I have shown and described the preferred embodiment of my invention, I do not wish to limit the same to the exact and precise details of structure, and reserve the right to make all modifications and changes so long as they remain within the scope of the invention and the following claims.

Having described my invention I claim:

1. A fishing line guide of the character described comprising at piece of tube, a slit in said tube along a portion of the tube designated as its bottom, an integral extension on each side of the middle portion of the tube directly opposite each other and positioned each midway between the said slit and the top longitudinal center of the tube; a clamp, said clamp having an internal round portion of a size to fit around said tube, said round portion of the clamp having a round hole in each side opposite each other and being of a size for fitting upon the said extensions on the tube; a straight portion integral with and extending from each side of said round portion and extending farther to form a half round portion of a size to fit around a fishing pole; a wing type screw, said straight portions having a threaded hole in one and a plain hole in the other, said screw being of a size to fit in said holes and draw the half round portions tightly adjacent a fishing pole handle portion.

2. A fishing line guide of the character described for use in combination with a fishing pole having a reel and fishing line mounted thereon, said guide comprising a piece of tube, a slit in said tube along a portion of the tube designated as its bottom, an integral extension on each side of the middle portion of the tube directly opposite each other and positioned each midway between the said slit and the top longitudinal center of the tube; a clamp, said clamp having an internal round portion of a size to fit around said tube, said round portion of the clamp having a round hole in each side opposite each other and being of a size for fitting upon the said extensions on the tube; a straight portion integral with and extending from each side of said round portion and extending farther to form a half round portion of a size to fit around said fishing pole; a wing type screw, said straight portions having a threaded hole in one and a plain hole in the other, said screw being of a size to fit in said holes and draw the half round portions tightly adjacent said fishing pole handle portion; said wing type screw being adapted by additional tightening to close the said slit in the tube.

References Cited in the file of this patent

UNITED STATES PATENTS

| | | |
|---|---|---|
| 1,196,962 | McDermott et al. | Sept. 5, 1916 |
| 2,394,706 | Makie | Feb. 12, 1946 |
| 2,691,840 | Smith | Oct. 19, 1954 |

FOREIGN PATENTS

| | | |
|---|---|---|
| 10,745 | Great Britain | 1899 |